United States Patent [19]

Sankar

[11] Patent Number: 4,691,707
[45] Date of Patent: Sep. 8, 1987

[54] AM/FM HYBRID ULTRASONIC IMAGING

[75] Inventor: Pat V. Sankar, Santa Ana, Calif.

[73] Assignee: The Regents of the University of California, Berkeley, Calif.

[21] Appl. No.: 846,868

[22] Filed: Apr. 1, 1986

[51] Int. Cl.$^4$ .............................................. A61B 10/00
[52] U.S. Cl. .......................................... 128/660; 73/602
[58] Field of Search ........................... 128/660–663; 73/599, 602; 364/414

[56] References Cited

U.S. PATENT DOCUMENTS

| 4,543,826 | 10/1985 | Ferrari | 128/660 X |
| 4,575,799 | 3/1986 | Miwa et al. | 73/602 X |
| 4,584,880 | 4/1986 | Matyuk | 73/602 X |
| 4,605,008 | 4/1986 | Ferrari | 128/660 |

OTHER PUBLICATIONS

Showker, T. H. et al., "Ultrasonic Tissue Characterization", in *Ultrasound Annual*, 1985, edited by R. C. Sanders et al., Raven Press, N.Y., ©1985, pp. 122–127.

Primary Examiner—Kyle L. Howell
Assistant Examiner—Francis J. Jaworski
Attorney, Agent, or Firm—Poms, Smith, Lande & Rose

[57] ABSTRACT

An ultrasonic acoustic imaging system includes a transmitter, a sonic pulse transducer which both applies acoustic pulses to the object under examination and receives echoes or reflected impulses, a digital scan converter, a display, and special reflected pulse processing circuitry for enhancing the displayed image. The special processing circuitry includes circuitry for the frequency demodulation of the reflected pulses, circuitry for providing a signal substantially representing the envelope or the amplitude of the reflected signal, and a multiplier for combining the frequency demodulated return signals with reflected envelope signals to apply to the scan converter. Alternative arrangements are also disclosed which produce substantially the same result.

14 Claims, 11 Drawing Figures

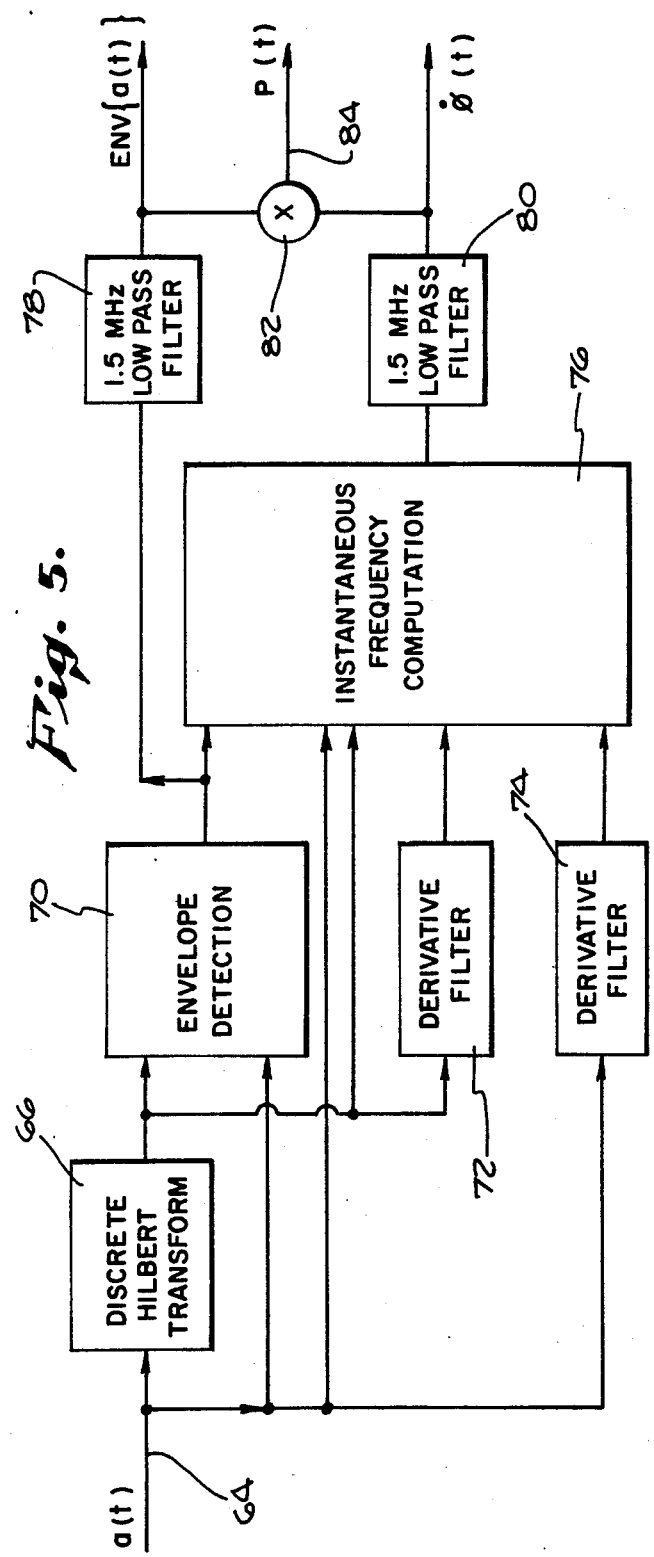
Fig. 5.
Fig. 4a (AM)
Fig. 4b (FM)
Fig. 4c (FILTERED AM)
Fig. 4d (AM/FM HYBRID IMAGE)

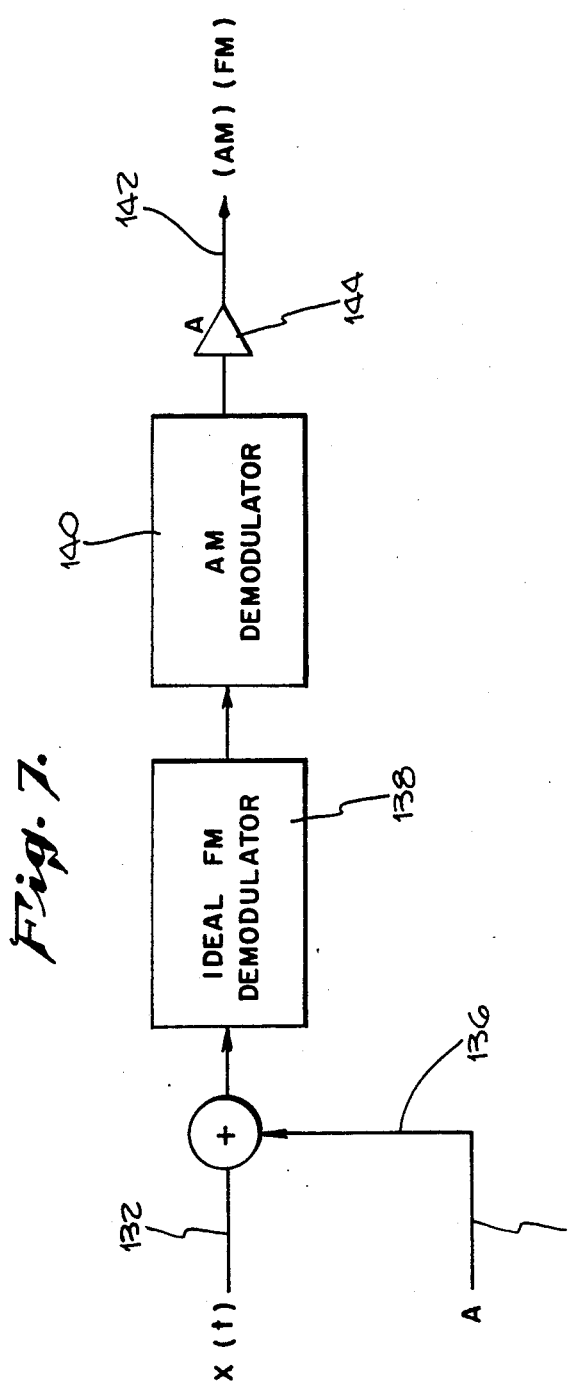
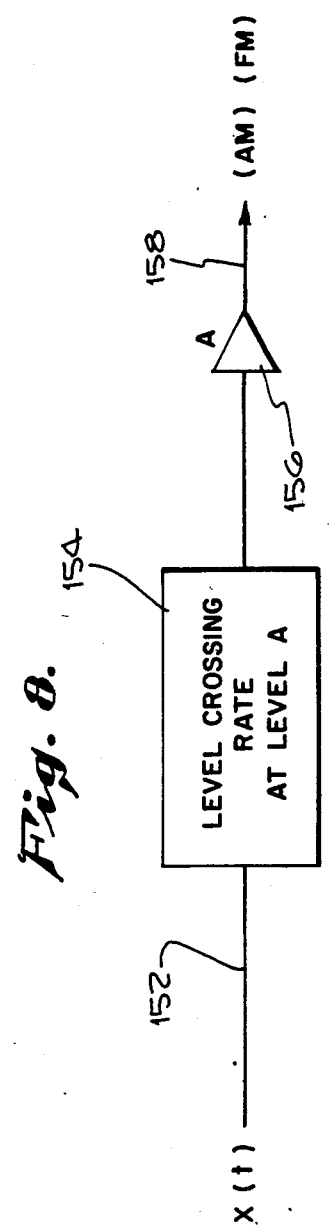

AM/FM HYBRID ULTRASONIC IMAGING

FIELD OF THE INVENTION

This invention relates to improved ultrasonic imaging systems.

BACKGROUND OF THE INVENTION

Apparatus which use ultrasonic energy for the diagnostic imaging of body and other structures are well known. Typically, pulses of ultrasound energy are directed into and reflected or scattered back from body tissues. The amplitude or the envelope of the reflected signals or echoes is detected and displayed to form images conforming to the outlines of various body organs and tumors, for example, when they are present.

Unfortunately, the images are not as clear as would be desirable, are often lacking in fine detail, and are obscured by large and bright laterally extending streaks or image distortions.

In U.S. Pat. No. 4,543,826, granted Oct. 1, 1985, is disclosed a system in which the reflected signals are frequency demodulated and applied to the scan converter to form the image. It is understood that the detail provided by such a system is improved, and that the laterally extending streaks mentioned above are eliminated, but the contrast and macroscopic image effect is poor. Also disclosed in U.S. Pat. No. 4,543,826 are systems in which the frequency demodulated signals are combined with the amplitude demodulated signals by simple summation, and a color display system wherein one signal is employed to control the "luminance" or brightness and the other is used to control the "chrominance" or color.

However, I have determined that, during certain portions of the pulse echo cycle, when the amplitude of the reflected signal is small, the frequency value takes wild excursions, resulting in a very noisy signal with very little dynamic range.

Accordingly, a principal object of the present invention is to provide an ultrasonic imaging system utilizing both amplitude and frequency demodulated signals, which avoids and overcomes the disadvantages of the prior art systems of the types mentioned above.

SUMMARY OF THE INVENTION

Stated simply, the present invention involves an ultrasonic imaging system in which the image signal is the effective product of two signals derived from the reflected signals, the first corresponding substantially to the amplitude or envelope of the reflected signals, and the second being a frequency demodulation of the return signals. The system would of course include the normal ultrasound transmitter, receiver, transducer, scanning apparatus, digital scan converter and display as employed in commercially available ultrasound imaging systems.

In reviewing the expression for the instantaneous frequency, I noted that it included a numerator and a denominator, with the square of the envelope (or amplitude) being included in the denominator. Accordingly, whenever the reflected amplitude is small, and this regularly occurs during intervals between pulses, the frequency value takes wild excursions. The currently available FM imaging techniques suppress the resulting noise effect by adding a squelch circuit of appropriate amplitude and frequency. However, this presents a new problem, and to a large extent defeats the purpose of using the FM signal, since the resultant image tends to resemble the conventional AM image, and except in particular instances is not definitely superior to the AM image.

However, the new product signal, involving multiplication of the detected FM signal by the detected AM signal, reduces the effect of the envelope signals in the denominator from a square factor to a linear factor and thus avoids the wild excursions, while retaining the benefits of the additional information provided by the demodulated FM signals.

This effective product signal may be obtained in several different ways. Thus, for example, a separate envelope detector, and a separate frequency demodulator (using a conventional discriminator) may be employed, with the outputs being multiplied before being applied to the digital scan converter of the ultrasound system.

Alternatively, the effective multiplication may be accomplished digitally using a discrete Hilbert transform and derivative filters to obtain the factors to be included in the expression for the envelope and the frequency demodulated signal, the two signals may be calculated, subjected to low pass filtering, and multiplied. The same calculation may be implemented by analog circuitry, replacing the Hilbert transform step with a 90 degree phase shift circuit.

It has also been determined that, if the reflected signals are modified by the addition of a DC component, and the resulting signal is frequency demodulated, the result is effectively equal to the product of the demodulated FM and AM signals. Similarly if a zero-crossing type FM detector is modified so that the crossings at a substantial dc level are used, the same result is achieved.

All of these systems have the effect of controlling the wild or extreme excursions of the FM signal, thereby eliminating noise, by reducing the "amplitude squared" term in the denominator of the FM signal expression, without limiting it arbitrarily by the squelch circuitry which eliminates much of the useful signal information included in the FM signal.

Other objects, advantages and features will become apparent from a consideration of the following detailed description and from the accompanying drawings.

BRIEF DESCRIPTION OF THE DRAWINGS

FIGS. 4a through 4d illustrate images formed by amplitude modulated signals, frequency modulated signals, filtered amplitude modulation signals and the product signals as noted above;

FIG. 5 illustrates a mathematical technique for obtaining product signals in accordance with one alternative of the present invention;

FIG. 7 is a simplified block diagram showing another alternative for obtaining an imaging system, illustrating the principles of the present invention; and FIG. 8 is a schematic showing of another alternative involving a level crossing FM detector with the crossing detections being displaced from zero.

DETAILED DESCRIPTION

Figure 1:
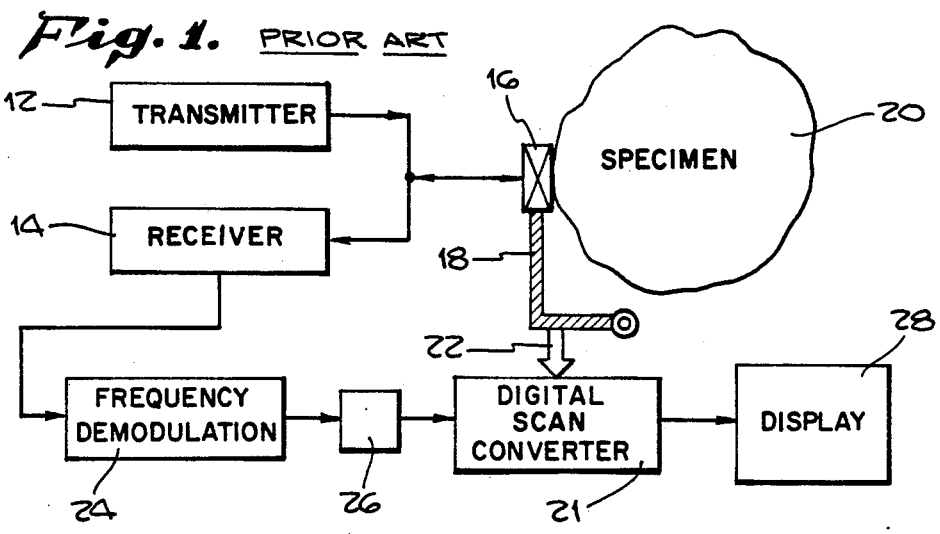
FIG. 1 is a schematic showing of a prior art acoustical imaging system employing frequency demodulation.

Referring more particularly to the drawings, FIG. 1 shows a conventional acoustic imaging system employing frequency modulation to generate acoustical images based upon reflections of ultrasonic pulses projected by the system. Scanners of the type shown in FIG. 1 are conventional, and such systems are known as "B-scanners", echo scanners, or real time ultrasound scanners. The system of FIG. 1 includes a transmitter 12 and a receiver 14 coupled to a transducer 16 mounted on an arm 18 for movement into engagement with the object or specimen 20 which is to be scanned. The transducer 16 projects an acoustic pressure signal in the form of an ultrasonic pulse and receives the ultrasonic echo signals known as "A-lines". Signals indicating the direction of scan of the transducer 16 are supplied to the digital scan converter 21 over the electrical signal path 22. The frequency demodulator circuit 24 may include a limiter circuit, a discriminator circuit, and a low pass filter circuit, all as described in U.S. Pat. No. 4,543,826 cited hereinabove. Signals from the frequency demodulator 24 are coupled to the circuit 26 for encoding into a video format by means known in the art. The output of the circuit 26 is thus a video signal carrying acoustical images of the specimen. This video signal is thereafter passed to the digital scan converter 21 which is programmed, as known in the art, with algorithms to process the video signals. These algorithms are basically digital filters which, in effect, "average" the various reflections received from any point on the specimen. Digital enhancement of the image of the specimen may also be performed in the scan converter. The output of the scan converter is thereafter coupled to the conventional display unit 28 which produces a line-by-line image.

Now, before continuing to discuss additional figures of the drawings, it is useful to briefly consider certain mathematical analyses which provide an insight into these ultrasound imaging phenomena.

Conventional ultrasound machines image the amplitude, or the envelope, of an analytical signal reflected from the specimen, as defined by:

$$\vec{a}(t) = a(t) - j\tilde{a}(t) \quad (1)$$

where the envelope of $\vec{a}(t)$ is given by:

$$env\{\vec{a}(t)\} = [a^2(t) + \tilde{a}^2(t)]^{\frac{1}{2}} \quad (2)$$

where a(t) is the pulse echo signal and $\tilde{a}(t)$ is the Hilbert transform of a(t).

The instantaneous frequency of the pulse echo signal is given by the following expression:

$$\phi(t) = \frac{\dot{a}(t) \cdot a(t) - \dot{\tilde{a}}(t) \cdot \tilde{a}(t)}{[a^2(t) + \tilde{a}^2(t)]} \quad (3)$$

Equation 3 may be rewritten as follows:

$$\phi(t) = \frac{\dot{a}(t) \cdot a(t) - \dot{\tilde{a}}(t) \cdot \tilde{a}(t)}{env^2\{a(t)\}} \quad (4)$$

From equation 4 it may be observed that the expression for instantaneous frequency is a differential expression divided by the square of the amplitude.

Figure 2:
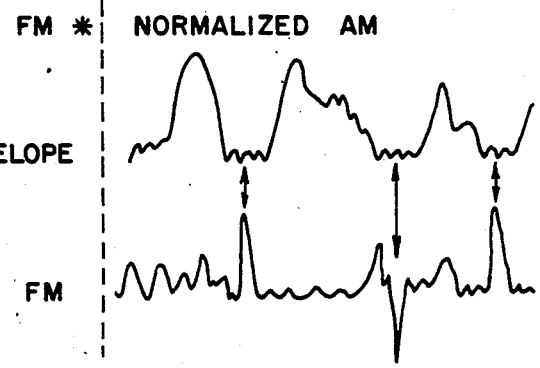
FIG. 2 is a diagram showing amplitude modulated and frequency modulated signals as reflected from a patient or other object, using an ultrasound system.

As may be seen from FIG. 2, the normalized amplitude of the return pulses drops close to zero in the areas designated by reference numeral 32, after the bulk of the reflections have been received by the transducer 16. In view of the presence of the denominator term involving the square of the amplitude of the envelope, the denominator term will go to a very low value, and the instantaneous FM signal, as indicated at peaks 34, will have some wild excursions.

As discussed in some detail hereinabove, an important feature of the present invention involves multiplying the demodulated frequency modulation signals with the demodulated amplitude modulated signals. By using the product of the amplitude of the demodulated amplitude modulation signal and the frequency demodulated signal, the weighting of the envelope term in the denominator is reduced from the squared amplitude to the first power of the amplitude, and the wild excursions are eliminated, while the information contained in the frequency demodulated signals is retained.

Figure 3:
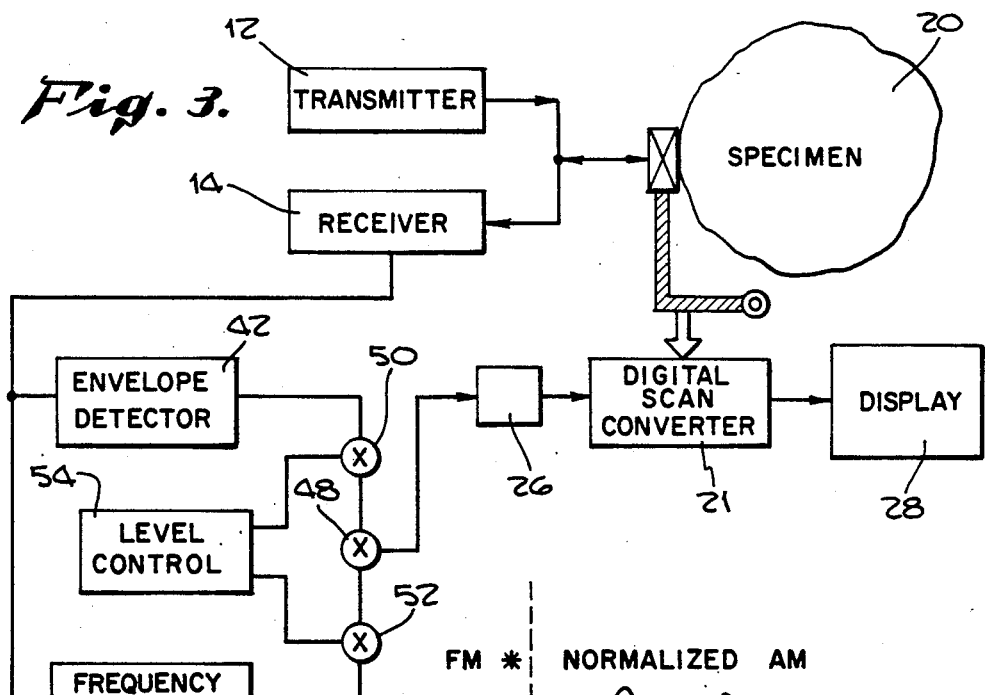
FIG. 3 is a schematic block diagram of an ultrasonic imaging system illustrating the principles of the present invention, utilizing the product of an amplitude demodulator and a frequency demodulator to provide an improved imaging signal.

FIG. 3 shows an acoustic imaging system illustrating the principles of the present invention in which new circuitry is provided for developing the signal input to the digital scan converter 21 from the receiver 14. Incidentally, the portions of the system which are unchanged from FIG. 1, bear the same reference numerals. In FIG. 3, the envelope or amplitude detector 42 receives the so-called "A-line" signals from the receiver 14, as does the frequency demodulator 44. The signals from the amplitude detector 42 and the frequency demodulated signals on lead 46 are combined in the multiplier circuit 48. The additional level control or multiplier circuits 50 and 52, under the control of the level control circuit 54, permit shifting of the relative levels of the detected amplitude signals and the frequency modulated detected signals applied to the multiplier 48 in order to optimize the display seen on the display unit 28.

Computer simulated images of the AM, FM and the product images of an in vivo liver/kidney scan are shown in FIG. 4. The pulse echo radio frequency data was collected with a three megahertz Phillips transducer. The frequency information in the range of 1.8 megahertz to 3.2 megahertz was linearly mapped into the gray scale range from 0 to 255. The AM and FM images were smoothed by a 1.5 megahertz filter and multiplied to produce the AM/FM hybrid image shown in FIG. 4d. The FM image almost resembles a scrambled noise image, as a result of the wild excursions as mentioned hereinabove. While the AM image tends to have a flat appearance and large and bright lateral streaks or artifacts, also known as "speckle", one can see that the product image of FIG. 4d is a substantially speckle-free image and appears to have more gray shades than the AM image. In addition, the organ boundaries are much more sharply defined in the product image of FIG. 4d than in the other images of FIGS. 4a, 4b and 4c.

Figure 6:
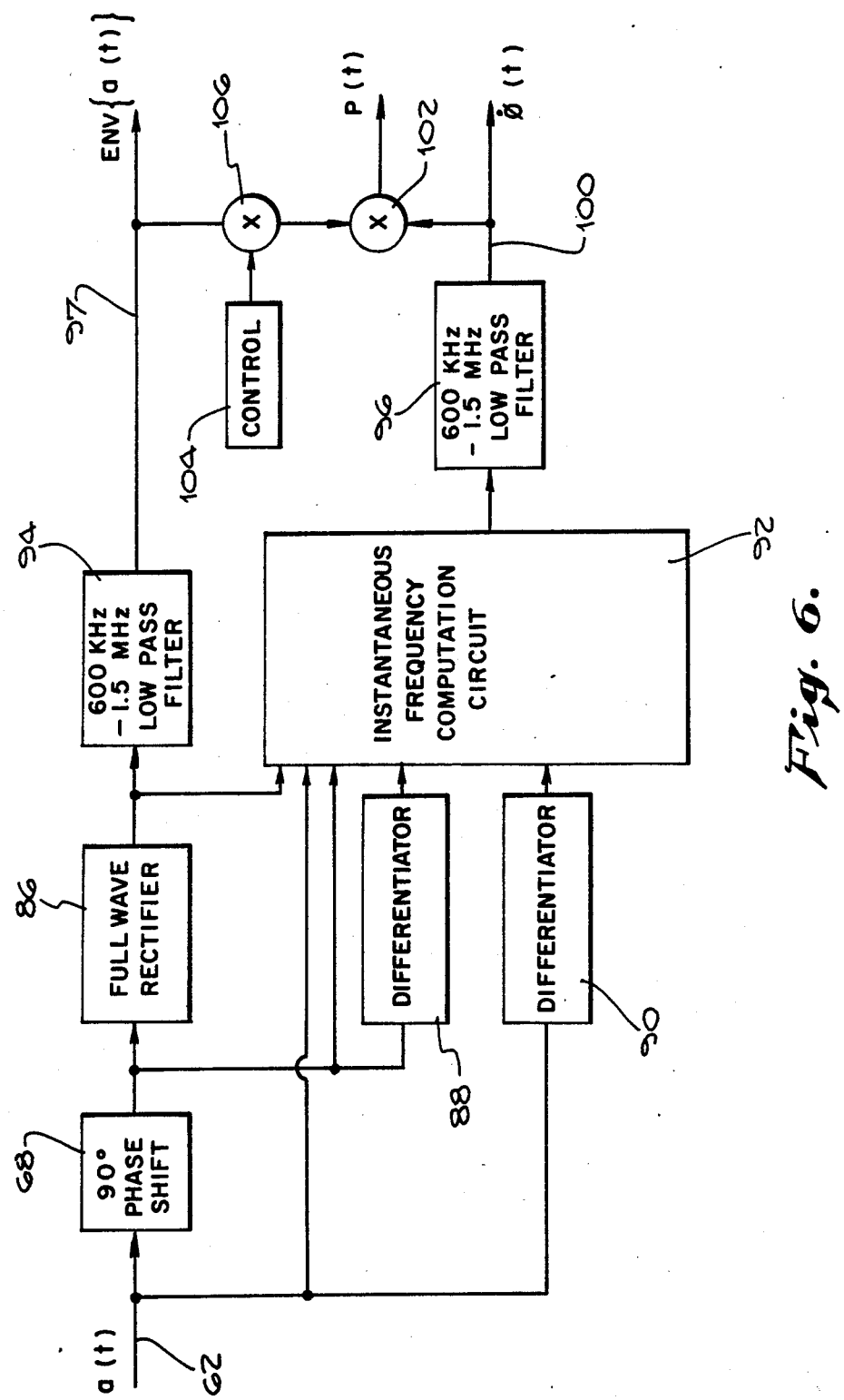
FIG. 6 is a block diagram of an analog system corresponding to the digital system of FIG. 5.

FIGS. 5 and 6 will now be considered concurrently, as FIG. 5 represents the computer implementation of steps employed to provide both the amplitude detected signal and the FM detected signal and to multiply them together, while FIG. 6 shows the analog implementation of the computer steps indicated in FIG. 5. More specifically, the input signal from receiver 14 is supplied on input lead 62 in FIG. 6. Similarly, relative to FIG. 5, the input reflected signals from the object being scanned is sampled at a very high rate, and the binary numbers representing successive samplings are supplied at point 64 as the starting point for the mathematical steps indicated in FIG. 5. The next step indicated in FIG. 5 is represented by block 66 in which the Hilbert transform corresponds to the 90 degree phase shift accomplished by the circuit 68 of FIG. 6. Incidentally, on an overall basis, it may be noted that the steps included in FIG. 5, and the circuitry included in FIG. 6 both accomplish the calculation of the instantaneous frequency of the pulse echo signal, as set forth in Equation 4 hereinabove, wherein the differential of the envelope both before and after the 90 degree phase shift, goes into the calculation, as well as the amplitude of the envelope. These additional functions are accomplished in accordance with FIG. 5 by the steps indicated by the envelope detection block 70, the two derivative filters 72 and 74, and the instantaneous frequency computation (following Equation No. 4) indicated by block 76. The two low pass filters 78 and 80 serve to eliminate noise which is above the signal band range. The multiplication step is indicated by the circle 82. The result as indicated by the line 84 was employed in the production of the image of FIG. 4d.

Comparable components included in FIG. 6 are the full wave rectifier 86, the two differentiators 88 and 90, and the computational circuit 92 which performs the calculation indicated in Equation 4. Low pass filters 94 and 96 are again provided, and the product of the detected AM signals on lead 98 and the demodulated FM signals on lead 100 are combined in the multiplier 102 after suitable level control modification of the amplitude modulated signal on lead 98 is accomplished by control circuit 104 and the additional multiplier 106.

FIGS. 7 and 8 show further alternative embodiments, wherein the output is effectively equal to the product of the detected AM and FM signals. More specifically, when a DC term, much larger than the average amplitude, is added to an RF signal, the FM demodulated output of the resultant signal has the characteristics of an amplitude detected times a frequency demodulated product signal. In FIG. 7, the output from the receiver 14 of FIG. 3 is supplied on lead 132, and is additively combined in circuit 134 with a biasing signal provided on lead 136, with the biasing term being much larger than the average amplitude of the RF signal. The combined signal is applied initially to an ideal FM demodulator 138, and subsequently to the AM demodulator 140. The signal on lead 142, as amplified by the amplifier 144 may be supplied to circuit 26 and to the digital scan converter 21 of FIG. 3, and constitutes another effective AM and FM product signal.

Similarly, the circuit of FIG. 8 also provides an output signal which is proportional to the same product. The circuit of FIG. 8 includes the input lead 152 which would be coupled to the output of receiver 14 of FIG. 3 and includes the level crossing rate determination circuit 154 wherein the rate of crossing of the input signal above and below a predetermined level designated "A" is provided. The output from cicuit 154 following amplification by circuit 156 provides a signal on lead 158 which may be applied to the circuit 26 and to the digital scan converter 21 of FIG. 3, in place of the intermediate circuitry shown in FIG. 3.

For completeness, reference is made to a prior article entitled "Use of Signal Phase in Medical Ultrasound", by L. Ferrari et al., Acta Electronica, Volume 26, 1984, pages 111 to 120. In addition, reference is made to the following text by way of background information: "Probability, Random Variables and Stochastic Processes", by A. Papoulis, McGraw Hill, New York, 1985.

Incidentally, as mentioned above, the prior U.S. Pat. No. 4,543,826 to Ferrari discloses the use of both the detected AM and demodulated FM to form the display. More specifically in FIG. 4 of the Ferrari patent it discloses separate envelope detection circuitry and frequency demodulation circuitry coupled to separate Digital Scan Converters and leading to a block designated "Displays". In Column 5, lines 18–20, the Ferrari patent states that the combining may be done by simple summation. As the only other specific example given in Ferrari, his FIG. 7 system is disclosed as using the amplitude or envelope demodulated signal and the FM demodulated signal to control chrominance and luminance, respectively, in a color display system. Ferrari also states broadly that he may obtain separate images of linear or nonlinear combinations of the amplitude modulated and frequency dmodulated images. Of course, this very broad statement would encompass all algebraic and other combinations of the two signals, even including $1/(x+xy^3+y^5)$ by way of example and not of limitation. Accordingly, where the two specific examples given are not directed to overcoming, and would not overcome, the wild excursions of the FM signal as discussed in detail above, it is clear that the present invention is distinct from, and an improvement over the disclosure of the Ferrari patent.

In conclusion, it is to be understood that the foregoing detailed description and the accompanying drawings relate to illustrative embodiments of the invention. Various minor changes, and specific implementations may be employed without departing from the spirit and scope of the invention. Thus, any conventional ultrasound equipment may be employed, with the frequency demodulated signal being modified by multiplication with an effective signal representing the amplitude to avoid the wild excursions provided by the square term of the amplitude in the denominator of the expression. Further, any known amplitude and frequency demodulation circuitry may be employed. Accordingly, the present invention is not limited to the structures precisely as shown and described hereinabove.

What is claimed is:

1. A high resolution ultrasonic acoustic system for imaging reflected or scattered acoustic signals from a non-homogeneous media supporting acoustic pulse propogation comprising:
    transmitter means for generating pulse signals;
    transducer means coupled to said transmitter means for transmitting acoustic pressure signals into said media, and for receiving acoustic pressure signals reflected from said media in response to the transmitted acoustic pressure signal;
    receiver means coupled to said transducer means for transforming the reflected acoustic pressure signals into electrical signals;
    means for processing said electrical signals to form an imaging signal constituting the effective product of the detected amplitude modulation of said electrical signals multiplied by the frequency demodulation of said electrical signals; whereby the extreme excursions of the frequency demodulated signals are eliminated; and display means, coupled to the output of said processing means and synchronized with said transducer means, for producing cross-sectional images of said media representative of both stationary and moving structures in said media.

2. A system as defined in claim 1 wherein said processing means includes means for detecting the envelope of said electrical signals, means for frequency demodulating said electrical signals, and means for multiplying said detected envelope and said frequency demodulated signals.

3. A system as defined in claim 1 wherein said processing means includes low pass filter means for eliminating high frequency noise beyond the frequency range containing useful image information.

4. A system as defined in claim 1 wherein said signal processing means includes means for shifting the phase of said electrical signals by substantially 90 degrees, first and second means for differentiating said electrical signals prior to and subsequent to the phase shift, respectively, full wave rectifier means for detecting the envelope of said electrical signals, and means for providing an electrical output equal to $$\frac{\dot{x}y - \dot{y}x}{z^2}$$

where $\dot{x}$ and $\dot{y}$ are the outputs from said first and second differentiating means, respectively, x and y are the signals being applied to said differentiating means, and z is the output of said full wave rectifier means.

5. A system as defined in claim 1 wherein said signal processing means includes means for adding to the electrical signals, a substantial D.C. bias, a frequency demodulator, an AM demodulator, and means for applying the biased electrical signals first to the frequency demodulator and then to the AM demodulator.

6. A system as defined in claim 1 wherein said signal processing means includes means for providing an output signal representative of the level crossing rate at a substantial DC level shifted from zero.

7. A system as defined in claim 1 including means for adjusting the relative magnitude of the frequency demodulated signals and the detected amplitude modulated signals, to optimize the final image.

8. A high resolution ultrasonic acoustic imaging system comprising:
   transducer means for applying acoustic pulses to a medium such as the human body in predetermined directions from said transducer means;
   pulse transmitter means for energizing said transducer means;
   means for receiving reflected acoustic signals from said transducer for amplifying them and for providing raw electrical reflection signals;
   a digital scan converter;
   control means coupled to said transducer means and to said digital scan converter for synchronizing the output of said scan converter;
   means for displaying an image derived from reflections from said medium to said transducer means; and
   means for processing said raw electrical reflection signals from said receiving means to provide an imaging signal constituting the effective product of the detected amplitude modulation of said reflection signals multiplied by the frequency demodulated reflection signals; whereby the extreme excursions of the frequency demodulated signals are eliminated; and
   means for coupling said imaging signal from said processing means to said digital scan converter.

9. A system as defined in claim 8 wherein said processing means includes means for detecting the envelope of said electrical signals, means for frequency demodulating said electrical signals, and means for multiplying said detected envelope and said frequency demodulated signals.

10. A system as defined in claim 8 wherein said processing means includes low pass filter means for eliminating high frequency noise beyond the frequency range containing useful image information.

11. A system as defined in claim 8 wherein said signal processing means includes means for shifting the phase of said electrical signals by substantially 90 degrees, first and second means for differentiating said electrical signals prior to and subsequent to the phase shift, respectively, full wave rectifier means for detecting the envelope of said electrical signals, and means for providing an electrical output equal to $$\frac{\dot{x}y - \dot{y}x}{z^2}$$

where $\dot{x}$ and $\dot{y}$ are the outputs from said first and second differentiations, respectively, x and y are the signals being applied to said differentiators, and z is the output of said full wave rectifier.

12. A system as defined in claim 8 wherein said signal processing means includes means for adding to the electrical signals, a substantial D.C. bias, a frequency demodulator, an AM demodulator, and means for applying the biased electrical signals first to the frequency demodulator and then to the AM demodulator.

13. A system as defined in claim 8 wherein said signal processing means includes means for providing an output signal representative of the level crossing rate M. at a substantial DC level shifted from zero.

14. A system as defined in claim 8 including means for adjusting the relative magnitude of the frequency demodulated signals and the detected amplitude modulated signals, to optimize the final image.

* * * * *